United States Patent [19]

Klompas

[11] 4,157,880
[45] Jun. 12, 1979

[54] TURBINE ROTOR TIP WATER COLLECTOR

[75] Inventor: Nicholas Klompas, Scotia, N.Y.

[73] Assignee: General Electric Company, Schenectady, N.Y.

[21] Appl. No.: 833,884

[22] Filed: Sep. 16, 1977

[51] Int. Cl.² ............................ F02C 7/12; F01D 5/18
[52] U.S. Cl. .................................. 415/115; 415/116; 416/95
[58] Field of Search ............... 415/114, 115, 116, 117, 415/172 A, 174; 416/95, 96 R, 97 R

[56] References Cited

U.S. PATENT DOCUMENTS

| | | | |
|---|---|---|---|
| 3,015,937 | 1/1962 | Giliberty | 415/116 |
| 3,446,481 | 5/1969 | Kydd | 416/95 |
| 3,736,071 | 5/1973 | Kydd | 415/168 |
| 3,816,022 | 6/1974 | Day | 416/96 |
| 3,834,001 | 9/1974 | Carroll et al. | 415/116 |

*Primary Examiner*—Louis J. Casaregola
*Attorney, Agent, or Firm*—Jerome C. Squillaro

[57] ABSTRACT

A gas turbine power plant has an arrangement for collecting coolant fluid exiting from fluid-cooled turbine buckets in the gas turbine. The buckets have radially extending internal coolant passages arranged to discharge coolant from the outer ends of each bucket. The arrangement for collecting the coolant exiting from the buckets comprises an annular chamber within the casing aligned with the buckets. A slotted annular wall is interposed between the chamber and the buckets, with the wall forming the entrance for discharged coolant fluid into the chamber. The wall has a plurality of adjacent sharply angled faces forming the annular inner surface and has slotted passages extending angularly and radially through the wall at the converging bases of adjacent angled faces. The angled faces of the inner surface diffuse the impact of the coolant fluid and direct the fluid to the passages and into the chamber.

6 Claims, 4 Drawing Figures

TURBINE ROTOR TIP WATER COLLECTOR

BACKGROUND OF THE INVENTION

1. Field of the Invention

The present invention relates generally to gas turbine power plants and more particularly to an arrangement for collecting fluid expelled from bucket tips of a liquid-cooled gas turbine.

2. Description of the Prior Art

It is well known that the efficiency and output of a gas turbine power plant can be improved by increasing the temperature of the hot motive gases and thereby increasing the operating temperature of the turbine. In order to achieve high operating temperatures, it is necessary to provide a means of cooling the most critical turbine components such as the combustion transition members, the turbine nozzles and the turbine buckets. One of the most effective means of cooling the turbine buckets is by supplying liquid coolant to internal passages within the buckets as shown in U.S. Pat. No. 3,446,481 to Kydd and assigned to the assignee of the instant application.

The coolant circulates through the passages in the buckets, transfers heat from the buckets and is then ejected from the open distal end of each bucket. The ejected fluid, consisting of coolant vapor and droplets, if discharged into the flow of hot motive gases, would greatly impair turbine performance and could produce erosion of downstream critical components. Therefore, it is necessary to effectively collect the coolant discharged from the buckets.

The prior art has recognized the necessity to collect the ejected coolant as disclosed in U.S. Pat. No. 3,736,071 to Kydd. In the Kydd structure liquid coolant is received in a collector formed by an open annular slot located within the casing of the turbine. In the U.S. Pat. No. 3,446,481, also to Kydd, ejected coolant is received in a collector formed by annular chamber located within the casing of the turbine.

A problem not solved by the prior art is that of the erosion of the material forming the collector. The coolant is ejected from the distal ends of the turbine buckets at peripheral speeds in excess of 1500 ft. per second. This tangential velocity along with the centrifugal forces on the ejected coolant, propels the coolant at a significant impact force that must be absorbed by the collector.

Another problem associated with an open-chambered collector is that turbulence generated in the collector by the buckets can disrupt the main flow of motive gases through the turbine. Turbulence can also return coolant into the flow of hot motive gases to further impair performance of the turbine.

Accordingly, one object of the invention is to provide an arrangement for more effectively collecting fluid expelled from turbine buckets in a liquid-cooled gas turbine.

Another object of the invention is to provide an arrangement for collecting fluid expelled from a liquid-cooled gas turbine in which the arrangement resists erosion and deterioration by the dynamics of the coolant fluid.

Still a further object of the invention is to provide an arrangement for collecting fluid from a liquid-cooled gas turbine in which the collected fluid is effectively maintained separate from the flow of motive gases.

SUMMARY OF THE INVENTION

The invention is directed to an arrangement for collecting coolant fluid exiting from fluid-cooled turbine buckets in a gas turbine power plant. The turbine includes a casing, a shaft rotatably supported in the casing, a turbine disc mounted on the shaft and a plurality of turbine buckets mounted on the disc and extending radially outwardly from the disc. The buckets have radially extending internal coolant passages arranged to discharge coolant from the outer ends of each bucket. The arrangement for collecting the coolant exiting from the buckets comprises an annular chamber within the casing aligned with the buckets. A slotted annular wall is interposed between the chamber and the buckets, with the wall forming the entrance for discharged coolant fluid into the chamber. The wall has a plurality of adjacent sharply angled faces forming the annular inner surface and has slotted passages extending angularly and radially through the wall at the converging bases of adjacent angled faces. The angled faces of the inner surface diffuse the impact of the coolant fluid and direct the fluid to the passages and into the chamber.

BRIEF DESCRIPTION OF THE DRAWINGS

While the novel features of the invention are set forth with particularity in the appended claims, the invention will be better understood along with other features thereof from the following detailed description taken in conjunction with the drawings in which:

DESCRIPTION OF THE PREFERRED EMBODIMENT

Figure 1:
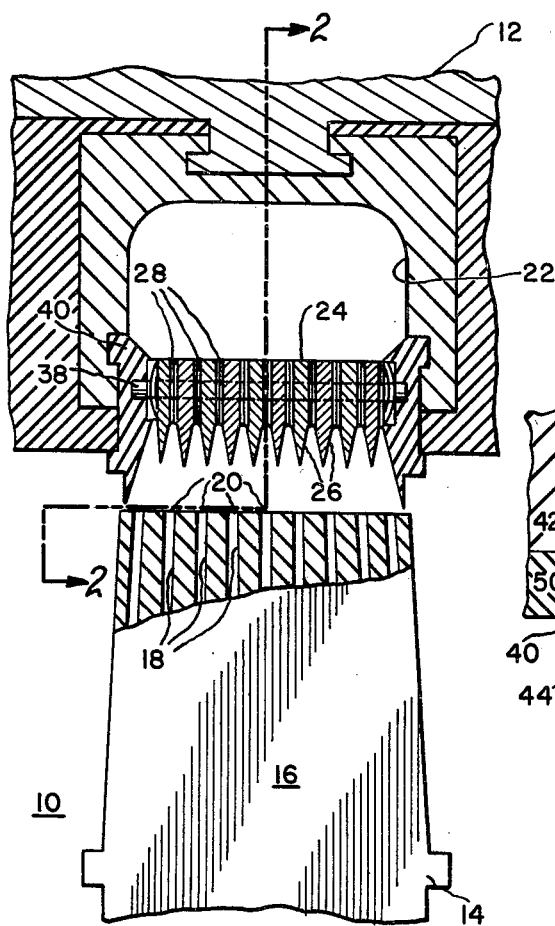
FIG. 1 is a longitudinal sectional view of a portion of a gas turbine employing the coolant fluid collector arrangement of this invention.

Referring first to FIG. 1, there is shown a portion of an axial flow turbine 10. A turbine casing 12 houses a rotatable shaft having a disc 14 with an annular row of buckets 16 extending radially outwardly therefrom. Hot motive gases at approximately 2800° F. are directed by nozzles (not shown) against the buckets 16 to rotate the turbine disc 14 and provide rotary power at the turbine output shaft. In order to resist hot corrosion, buckets 16 have radially extending internal coolant passages 18 arranged to circulate coolant through the buckets. The coolant passages 18 have openings 20 provided for the exit of heated coolant fluid (vapor and excess liquid coolant) at the outer ends of buckets 16.

In order to collect the coolant fluid expelled from openings 20, the casing 12 includes an annular chamber 22 which is axially aligned with the rotatable buckets 16. A slotted annular wall 24 is interposed between chamber 22 and buckets 16 whereby the wall forms the entrance for the expelled coolant fluid into the chamber.

The annular wall 24 has a plurality of adjacent, sharply angled faces 26 forming the inner surface of the wall. The wall 24 has slotted passages 28 extending radially and angularly through the wall at the converging bases of the sharply angled faces 26. The sharply angled faces 26 receive the coolant fluid, having a velocity in excess of 1500 feet per second, expelled from openings 20 of buckets 16. The sharply angled faces 26 present a large surface area and a low incident angle exposed to impingement by the high velocity coolant fluid and thereby resist erosion by the fluid. The angled faces 26 diffuse and deflect the expelled coolant into adjacent faces and into the slotted passages 28 and finally through the slotted passages and into the annular chamber 22. Chamber 22 is provided with a means for draining the collected coolant fluid (not shown) which is received in the chamber and which flows by gravity around the chamber to the drainage means.

Figure 2:
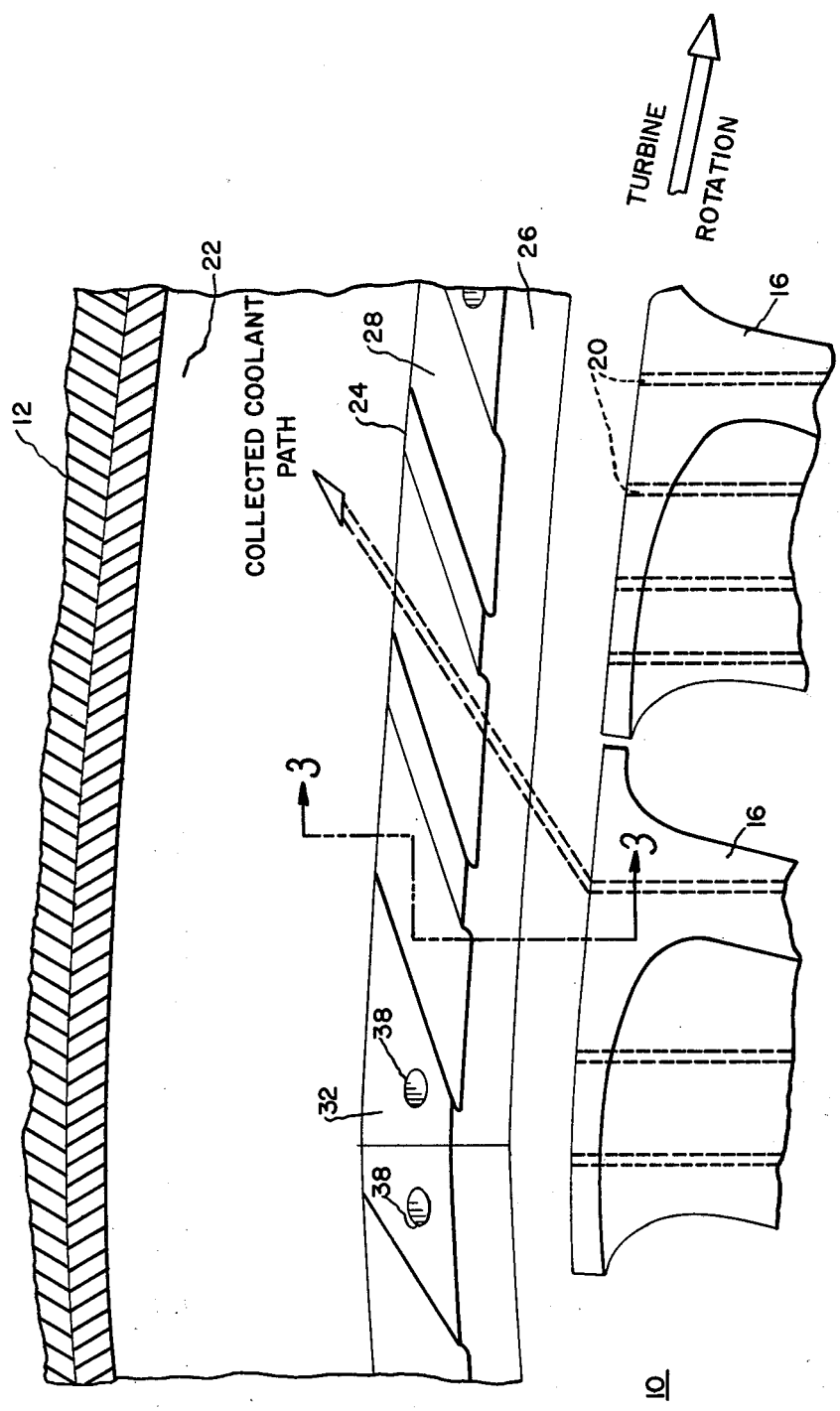
FIG. 2 is an enlarged transverse sectional view taken along line 2—2 of FIG. 1.

Referring now to FIG. 2, the coolant fluid collection arrangement is shown in a transverse sectional view showing particularly the slotted passages 28 through wall 24. Slotted passages 28 extend through wall 24 at the converging bases of the sharply angled faces 26. Passages 28 extend radially and angularly through wall 24 to closely correspond with the trajectory of the coolant fluid expelled from the buckets 16. The coolant fluid is expelled having a radial velocity component exerted by centrifugal force and having a tangential velocity component exerted by the rotational velocity of buckets 16. The resultant velocity has a direction which is a vector sum of these two components. Thus, as in the form illustrated, where the radial velocity component and the tangential velocity component are substantially equal the resulting velocity has an angle of approximately 45° from radial toward the direction of rotation of the buckets. In this case the slotted passages 28 are correspondingly inclined at an angle of approximately 45° in the direction of rotation of the buckets, as shown in FIG. 2.

Figure 3:
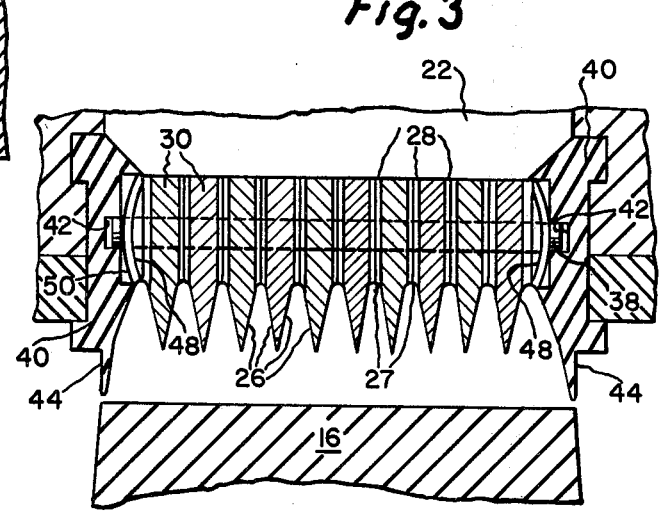
FIG. 3 is a cross-sectional view taken along line 3—3 of FIG. 2.
Figure 4:
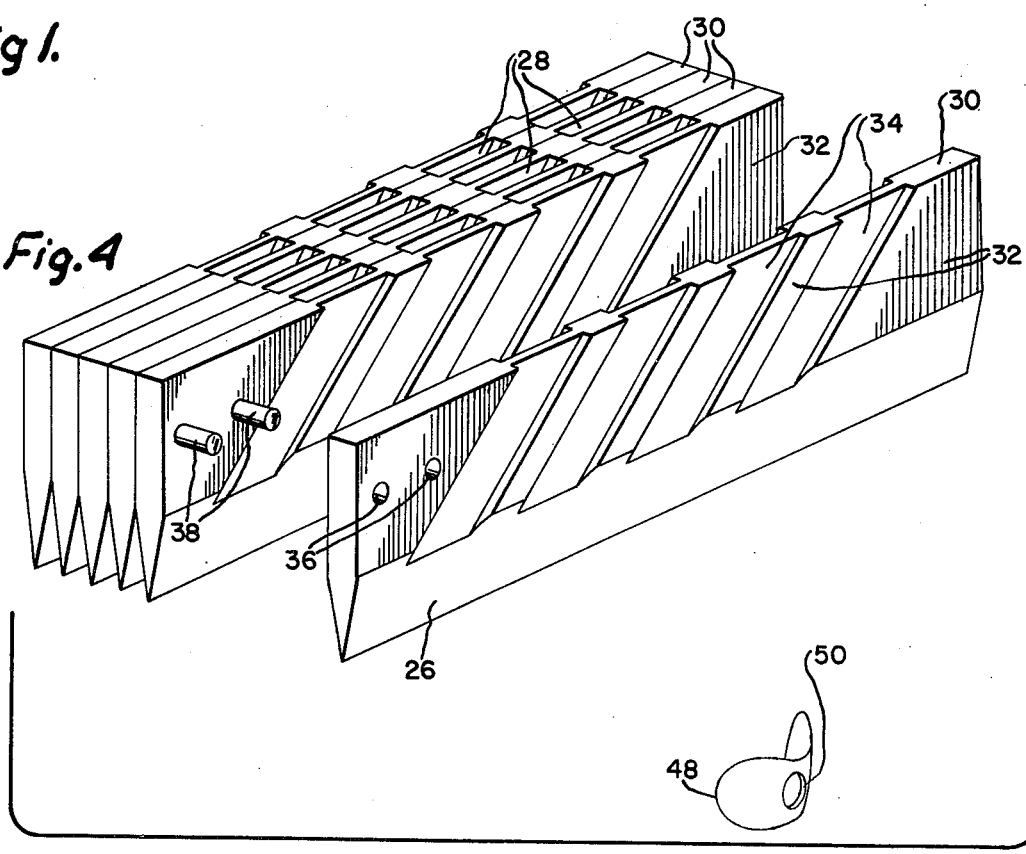
FIG. 4 is an exploded prespective view of the slotted annular wall which forms the entrance to the chamber shown in FIG. 3.

The preferred structure of wall 24 is shown in FIGS. 3 and 4 as a plurality of adjacently positioned arcuate segments 30. Each segment 30 has a generally flat surface 32 with slots 34 radially and angularly disposed therein. Each segment 30 has a sharply tapered inner edge which forms the sharply angled faces 26 of the inner surface of wall 24. The slots 34 form the slotted passages 28 at the converging bases 27 of the angled faces 26 when segments 30 are adjacently positioned to form wall 24. Each segment 30 has a plurality of aligned apertures 36 circumferentially disposed through the flat surfaces 32. The apertures 36 receive retaining pins 38 which align the segments to form the wall 24.

Referring particularly to FIG. 3, there are shown segments 30 adjacently positioned on pins 38 to form wall 24. The inner side walls of chamber 22 include annular retaining plates 40 having circumferential grooves 42 which receive and support the ends of pins 38. Plates 40 also have sealing shrouds 44 which are closely aligned with buckets 16. The sealing shrouds 44 serve to confine the transfer of coolant fluid from buckets 16 to chamber 22 and isolate the coolant fluid from the flow of hot motive gases through the turbine. Plates 40 also have recesses 46 which support springs 48. Springs 48 are shown as arcuate discs having central apertures 50. Springs 48 fit over pins 38 and are interposed between retaining plates 40 and the outermost segment of segments 30 to compressively urge segments 30 into abutting firm contact to form wall 24. In adjacent position, the narrow transverse passages 28 resist entry by the axially flowing motive gases and tends to further maintain separation of the collected coolant fluid from the flow of motive gases. Alternatively, any type of compressive spring means could sufficiently urge the segments in abutting firm contact to form wall 24.

In the particular embodiment shown, wall 24 is formed by ten arcuate segments 30. Each segment is 0.25 inches thick and has a radial height of 1.25 inches and a tapering inner-edge radial height of 0.50 inches. The radially and angularly disposed slots in each segment are 0.06 inches deep and form a plurality of 0.12 inch passages with the slots of the adjacent segments.

As an alternative embodiemnt, wall 24 can be formed from a single member having the sharply angled faces 26 as the inner surface and having slotted passages 28 through the wall at the converging bases of adjacent angled faces.

As another alternative, wall 24 can be formed from a plurality of arcuate segments 30 which are laminated together by a method such as diffusion bonding rather than being retained by springs and pins.

The above-described arrangement provides for more effectively collecting fluid expelled from liquid-cooled turbine buckets. The sharply angled faces of the inner surface of the collection chamber present a large surface area and a low incident angle exposed to impingement by high velocity coolant fluid and thereby resist erosion and deterioration by the dynamics of the collected fluid. The sealing shrouds of the retaining plates and the transverse orientation of the slotted passages through the chamber wall effectively separate the collected fluid from the axial flow of motive gases through the turbine.

While a specific embodiment of the present invention has been illustrated and described herein, it is realized that modifications and changes will occur to those skilled in the art. It is therefore to be understood that the appended claims are intended to cover all such modifications and changes as fall within the true spirit and scope of the invention.

I claim:

1. In a gas turbine including a casing, a shaft rotatably supported in said casing, a turbine disc mounted on said shaft and turbine buckets mounted on the outer rim of said disc and extending radially outwardly therefrom, said buckets having radially extending coolant passages therein arranged to discharge coolant from the outer ends of said buckets, an arrangement for collecting the coolant fluid exiting from the coolant passages comprising:
   (a) an annular chamber within said casing axially aligned with said buckets;
   (b) a slotted annular wall interposed between said chamber and said buckets, said wall forming the entrance into said chamber for coolant fluid discharged from the buckets; and
   (c) said wall having a plurality of adjacent, sharply angled faces forming the annular inner surface and having slotted passages extending angularly and radially through said wall at the converging bases of adjacent angled faces, whereby said faces diffuse the impact of the coolant fluid and direct the fluid to the passages and into said chamber.

2. The coolant fluid collection arrangement as recited in claim 1, wherein said slotted passages extending radially and angularly through said wall are inclined at an angle corresponding with the vectoral direction of the expelled coolant fluid as determined by the centrifugal force on the radial component and the tangential component imparted by the rotational velocity of the turbine buckets on the fluid.

3. The arrangement as recited in claim 2, wherein the slotted passages are inclined at an angle of approximately 45° in the direction of rotation of the turbine buckets.

4. The coolant fluid collection arrangement as recited in claim 1, wherein said slotted annular wall comprises:
   (a) a plurality of arcuate segments each having generally flat surfaces with slots angularly and radially disposed therein;
   (b) each said segment having a sharply tapered inner edge; and
   (c) said arrangement having means for positioning said segments in adjacent annular layers to thereby form said wall, and said radially and angularly disposed slots on said segments forming said slotted passages.

5. The coolant fluid collection arrangement as recited in claim 4, wherein said means for positioning said segments comprises:
   (a) aligned apertures circumferentially disposed through the flat surfaces of said segments;
   (b) a plurality of pins extending through said apertures and engaging said segments;
   (c) the inner side walls of said chamber including annular retaining plates;
   (d) said retaining plates having circumferential grooves; and
   (e) said pins being received in said grooves for positioning said wall.

6. The coolant fluid collection system as recited in claim 5, further comprising:
   a plurality of compression springs interposed between the outermost layer of said segments and said retaining plates, whereby the layers of said segments are compressably urged into abutting firm contact.

* * * * *